US009752506B2

(12) United States Patent
Schwartz et al.

(10) Patent No.: US 9,752,506 B2
(45) Date of Patent: Sep. 5, 2017

(54) DEVICE FOR CONNECTING A FIXED PORTION OF A TURBINE ENGINE AND A DISTRIBUTOR FOOT OF A TURBINE ENGINE TURBINE

(71) Applicant: SNECMA, Paris (FR)

(72) Inventors: Eric Schwartz, Seine Port (FR); Fabien Garnier, Egly (FR); Helene Condat, Limeil-Brevannes (FR); Renaud Gabriel Constant Royan, Susy en Brie (FR); Patrick Joseph Marie Girard, Saint Fargeau Ponthierry (FR)

(73) Assignee: SNECMA, Paris (FR)

( * ) Notice: Subject to any disclaimer, the term of this patent is extended or adjusted under 35 U.S.C. 154(b) by 199 days.

(21) Appl. No.: 14/503,721

(22) Filed: Oct. 1, 2014

(65) Prior Publication Data
US 2015/0089957 A1 Apr. 2, 2015

(30) Foreign Application Priority Data
Oct. 1, 2013 (FR) ...................... 13 59489

(51) Int. Cl.
F02C 7/20 (2006.01)
F01D 9/02 (2006.01)
(Continued)

(52) U.S. Cl.
CPC .................. F02C 7/20 (2013.01); F01D 9/02 (2013.01); F01D 25/08 (2013.01); F01D 25/243 (2013.01);
(Continued)

(58) Field of Classification Search
CPC ...... F02C 7/20; F02C 7/24; F02C 7/28; F02C 7/32; F01D 11/003; F01D 25/28;
(Continued)

(56) References Cited

U.S. PATENT DOCUMENTS 5,224,822 A * 7/1993 Lenahan ................. C23C 30/00
415/177
2002/0122716 A1 9/2002 Beacock et al.
(Continued)

FOREIGN PATENT DOCUMENTS

EP 1 391 582 A2 2/2004
FR 2 913 718 A1 9/2008
GB 2434414 * 7/2007 ............... F01D 9/04

OTHER PUBLICATIONS

French Search Report and Written Opinion issued Feb. 10, 2014 in French Patent Application No. 1359489 with English Translation of Category of Cited Documents.

Primary Examiner — Andrew Nguyen
(74) Attorney, Agent, or Firm — Oblon, McClelland, Maier & Neustadt, L.L.P.

(57) ABSTRACT

A device for connecting a fixed turbine engine portion and a distributor foot of a turbine engine turbine is provided. The device includes a ring-shaped body adapted so as to be connected and secured to the fixed turbine engine portion, and two ring-shaped upstream and downstream brackets secured to the body, both brackets being adapted so as to clamp the foot of the distributor. At least one bracket is interrupted by forming an expansion or retraction slot, the slot allowing an expansion of the bracket tending to close the slot or retraction of the bracket tending to further open the slot, under the effect of a difference in internal temperatures of the device.

15 Claims, 10 Drawing Sheets

(51) Int. Cl.
*F01D 25/24* (2006.01)
*F01D 25/08* (2006.01)

(52) U.S. Cl.
CPC ........ *F01D 25/246* (2013.01); *F05D 2220/32* (2013.01); *F05D 2240/15* (2013.01); *F05D 2240/91* (2013.01); *F05D 2260/30* (2013.01); *Y02T 50/675* (2013.01)

(58) Field of Classification Search
CPC ........ F01D 25/246; F01D 9/02; F01D 11/001; F01D 11/005; F01D 25/243; F05D 2240/90; F05D 2240/91; F05D 2240/14; F05D 2260/30
See application file for complete search history.

(56) References Cited

U.S. PATENT DOCUMENTS

| | | | |
|---|---|---|---|
| 2004/0036230 A1 | 2/2004 | Matsuda et al. | |
| 2004/0168443 A1 | 9/2004 | Moniz et al. | |
| 2004/0223846 A1* | 11/2004 | Taylor | F01D 11/14 415/200 |
| 2005/0244267 A1* | 11/2005 | Coign | F01D 9/023 415/189 |
| 2006/0275111 A1* | 12/2006 | Orlando | F01D 5/141 415/191 |
| 2007/0059158 A1* | 3/2007 | Alvanos | F01D 5/081 415/115 |
| 2010/0092281 A1 | 4/2010 | Habarou et al. | |

* cited by examiner

DEVICE FOR CONNECTING A FIXED
PORTION OF A TURBINE ENGINE AND A
DISTRIBUTOR FOOT OF A TURBINE
ENGINE TURBINE

TECHNICAL FIELD

It relates to the technical field of aircraft turbine engines. In particular it relates to a field of devices adapted for connecting a distributor foot and a fix portion of a turbine engine.

STATE OF THE ART

Devices are known for connecting a fixed turbine engine portion, for example an inter-turbine casing 2, and a distributor foot of a turbine engine, for example a low pressure turbine engine turbine.

Such devices comprise one or several ring-shaped parts so as to extend them to 360° around a turbine engine shaft.

Such devices comprise a body adapted so as to be connected and secured to a fixed portion of a turbine engine, for example by means of a flange.

Such devices further comprise two ring-shaped upstream and downstream brackets secured to the body, both brackets being adapted so as to come and clamp a foot of the distributor.

Figure 1:
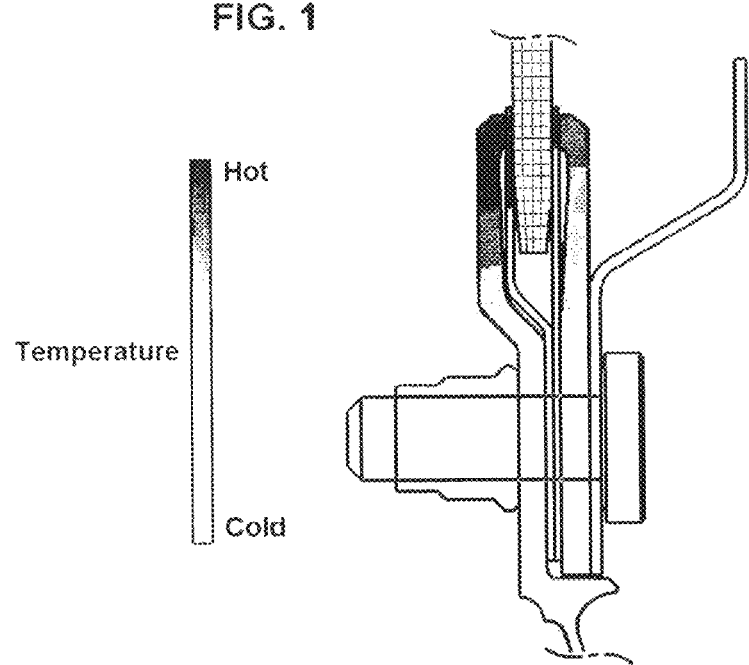
Figure 2:
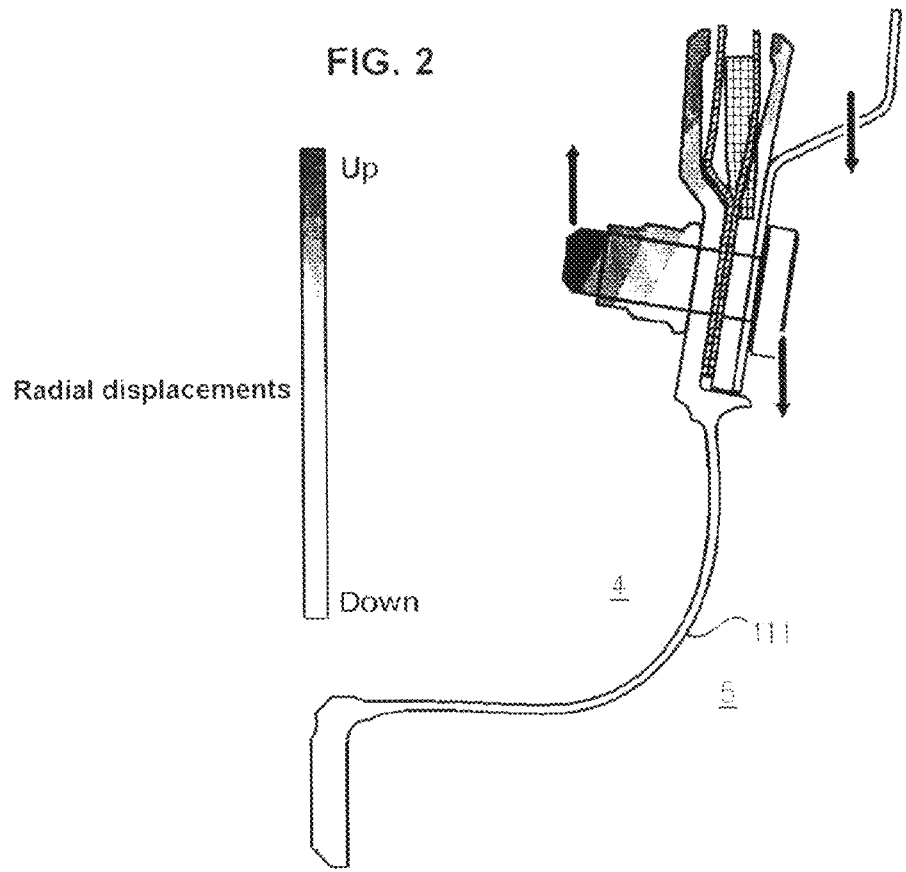

FIGS. 1 and 2 illustrate an example of such a device.

Such a device inter alia allows isolation of the upstream and downstream chambers from each other, the upstream and downstream chambers being respectively positioned up upstream and downstream from the distributor foot.

However, during normal operation of the turbine engine, the upstream side of the device is subject to significant heat radiation from the fixed turbine engine portion, for example from the inter-turbine casing 2, as well as to possible returns of a high temperature fluid into the upstream and downstream chambers.

The portions located upstream may attain high temperatures, typically of the order of 800 to 1100° C. the portions of the device located downstream remain at relatively cool temperatures, typically of the order of a few hundred degrees Celsius, typically of the order of 500° C.

The result of this is a particularly high temperature gradient between the upstream and downstream sides of the device (axial gradient), and between the outer portion and the inner portion (radial gradient) relatively to the axis of the turbine engine, in particular between the upstream outer portion and the downstream inner portion.

Such a temperature gradient is for example illustrated in FIG. 1.

This temperature gradient causes a variation in the tangential stresses within the device.

The hotter areas tend to expand, to extend and therefore to move towards the outside of the engine.

Conversely, the cooler areas tend to retract towards the axis of the turbine engine.

As illustrated in FIG. 2, the combination of both of these effects in different areas of the device causes a moment of tilting or unfolding of the device towards the downstream side at its outer edge.

However, the presence of the foot of the distributor prevents unfolding of the device. The foot of the distributor is then subject to the corresponding forces.

Figure 3:
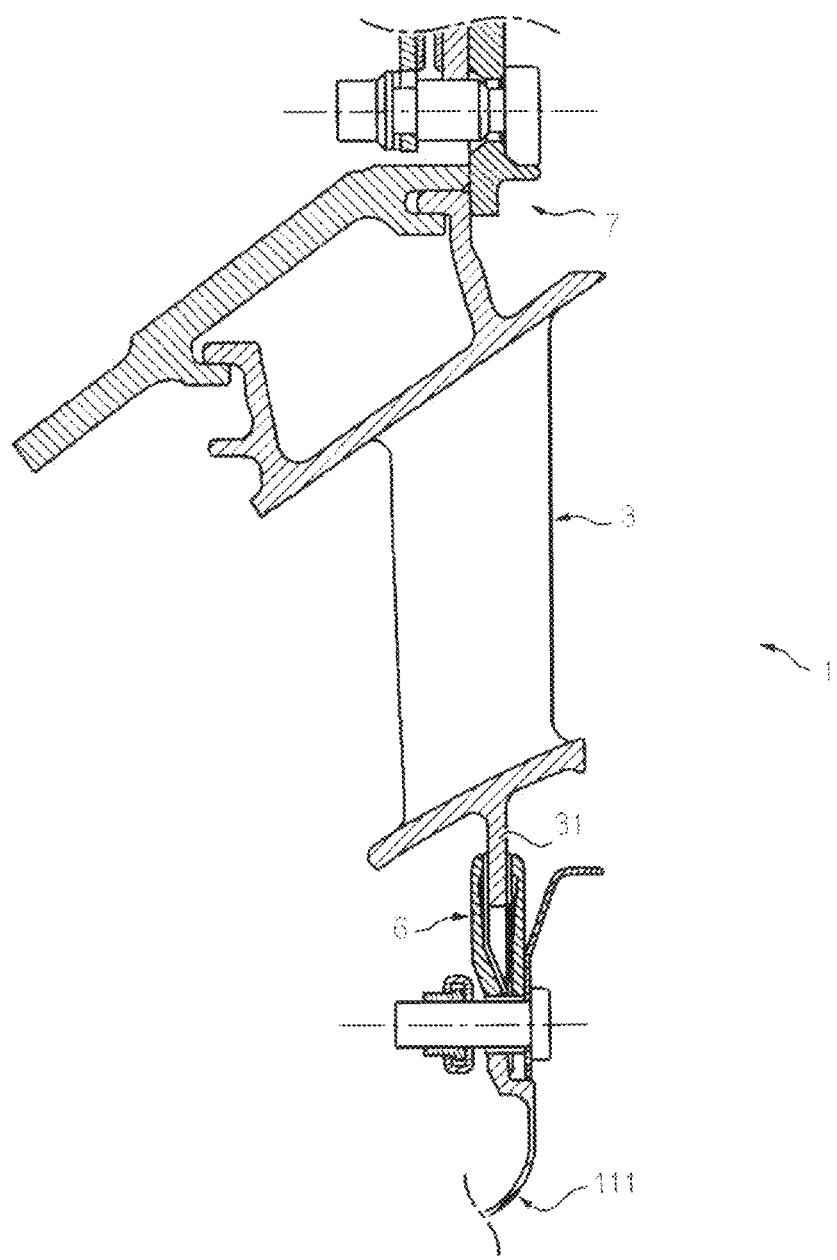

As illustrated in FIG. 3, the distributor is typically blocked at its head by hooks of the casing of the turbine engine opposing these forces. The distributor is subject to stresses which reduce its lifetime and risk causing its failure.

Further, these constraints result from thermal gradients in an area of reduced size. Thus, the stresses may strongly vary depending on the conditions to which the device is subjected and are difficult to predict.

PRESENTATION

An object of the invention is to increase the lifetime of the distributor.

For this purpose, a device is provided for connecting a fixed turbine engine portion and a distributor foot of a turbine engine turbine, comprising:
 a ring-shaped body adapted so as to be connected and secured to the fixed turbine engine portion, and
 two ring-shaped upstream and downstream brackets secured to the body, both brackets being adapted so as to come and clamp the foot of the distributor,
 wherein at least one bracket is interrupted by forming an expansion or retraction slot, the slot allowing expansion of the bracket tending to close the slot or retraction of the bracket tending to further open the slot, under the effect of the difference in internal temperatures of the device.

The presence of such a slot allows modification of the profile of stresses within the device. The result of this is a substantial reduction in the extent of the tilting moment of the device.

The tilting forces exerted on the foot of the nasal by the device are then reduced, reducing by as much the wear of the distributor and the risks of failure of the distributor at a stress area.

It is thus possible to reduce the stresses to which the distributor is subject.

Another advantage is to increase the robustness of the system, notably from the thermal point of view.

The invention is advantageously completed by the following features, taken alone or in any of their technically possible combinations,
 the slot extends from an outer edge of the bracket towards the body,
 the slot extends from the outer edge of the bracket as far as the body,
 said at least one interrupted bracket comprises the upstream bracket,
 said at least one interrupted bracket comprises the downstream bracket,
 the body further comprises a ring-shaped flange adapted so as to be connected and secured to a fixed turbine engine portion so that the device prevents any fluid circulation under the foot of the distributor, between upstream and downstream chambers positioned upstream and downstream respectively from the distributor foot,
 a ring-shaped overlapping downstream metal sheet secured to the body and positioned downstream from the brackets so as to limit heating-up of a downstream chamber positioned under and downstream from the foot of the distributor, by a fluid from a vein located above the downstream chamber, wherein the overlapping downstream metal sheet is interrupted while forming an expansion slot, the expansion slot allowing expansion of the overlapping downstream metal sheet tending to close the slot under the effect of a difference in internal temperatures of the device, the upstream bracket is planar and the downstream bracket has an inner portion connected to the body and an outer portion shifted relatively to the inner portion while forming a projection, so that ends of both brackets are separated by a receiving space from the foot of the distributor, the projection being directed towards the downstream side so as to orient the tangential stresses applied by the device to the distributor by differences in internal temperatures of the device.

The invention also relates to a device for connecting a fixed turbine engine portion and a distributor foot of a turbine engine turbine, comprising:
a ring-shaped body adapted so as to be connected and secured to the fixed turbine engine portion, and
a ring-shaped overlapping downstream metal sheet secured to the body, the overlapping downstream metal sheet being laid out so as to limit heating-up of a downstream chamber by a fluid from a vein located above the downstream chamber, the downstream chamber being positioned under and downstream from the foot of the distributor,
wherein the overlapping downstream metal sheet is interrupted while forming an expansion or retraction slot, the slot allowing expansion of the overlapping downstream metal sheet tending to close the slot or retraction of the discourager joint tending to further open the slot under the effect of a difference in internal temperatures of the device.

The invention further relates to a turbine of a turbine engine comprising a device as described earlier.

The invention further relates to a turbine engine comprising a device as described earlier.

DRAWINGS

Figure 4:
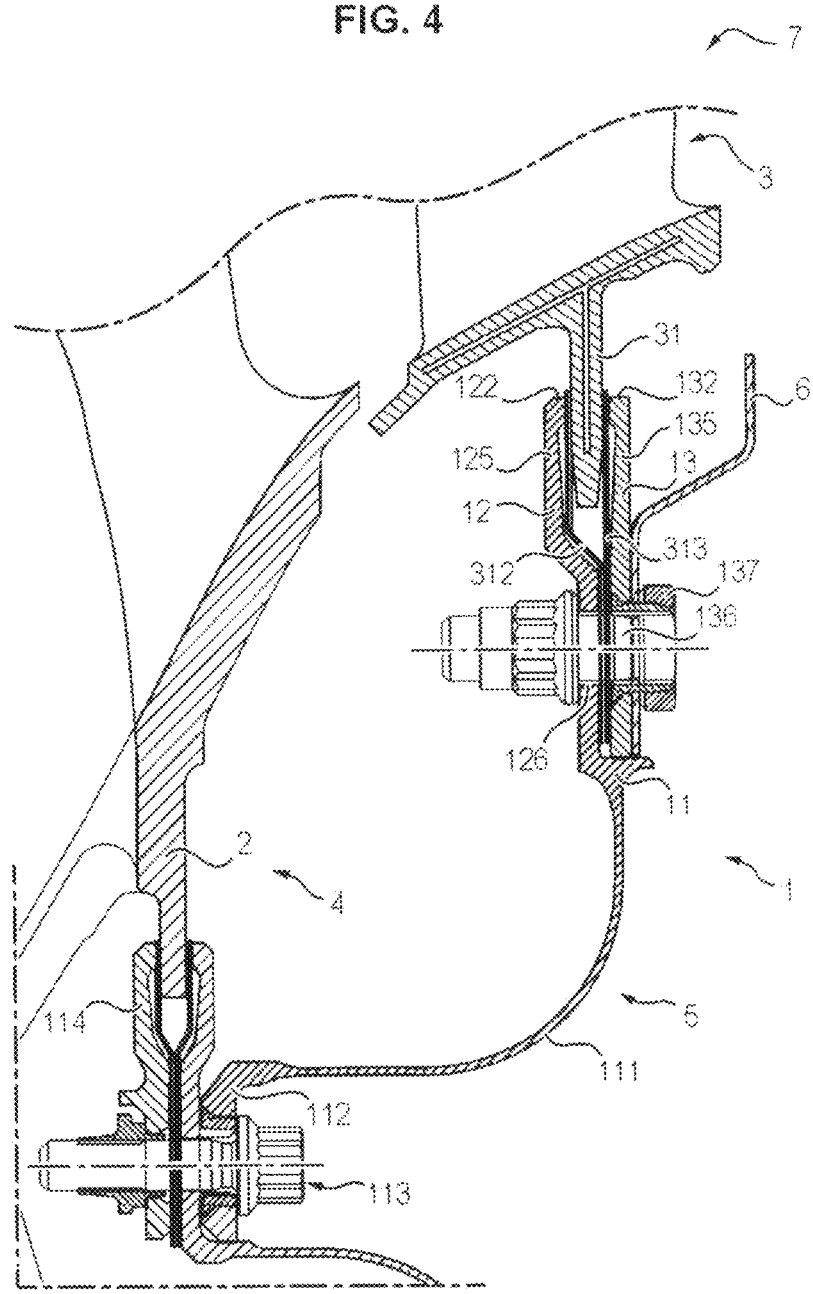
Figure 5:
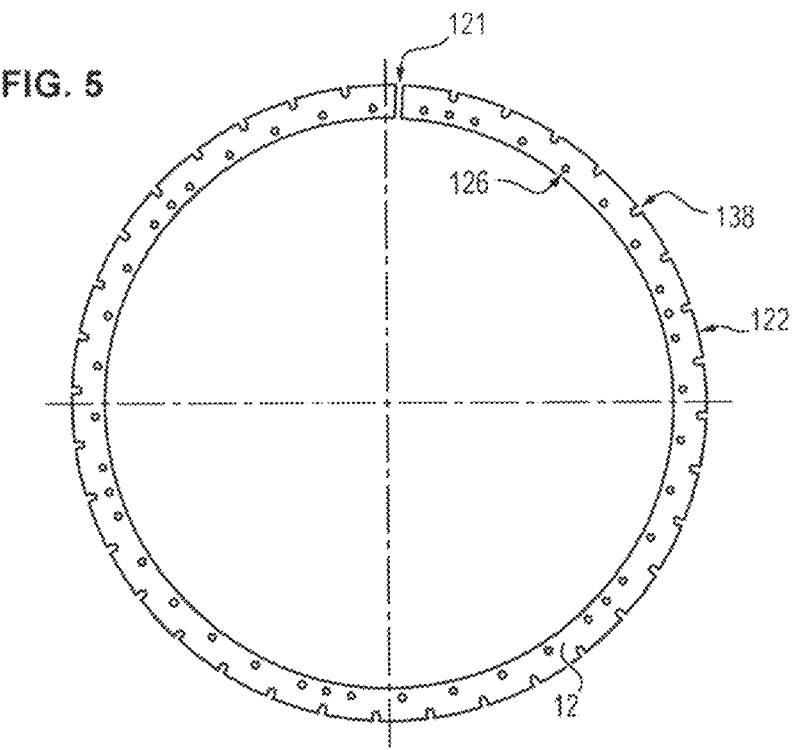
Figure 6:
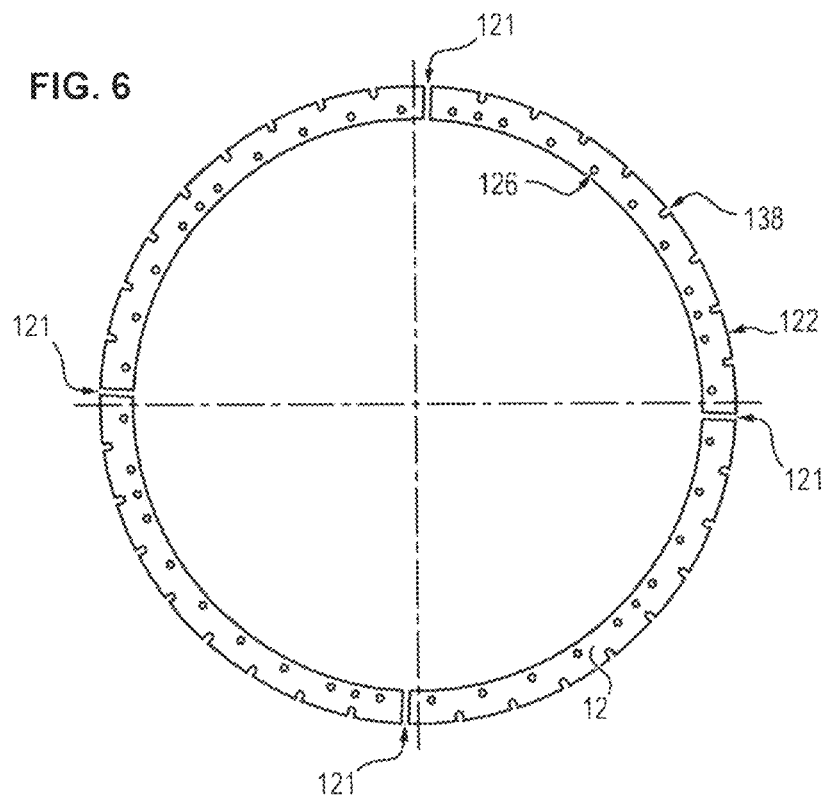
Figure 7A:
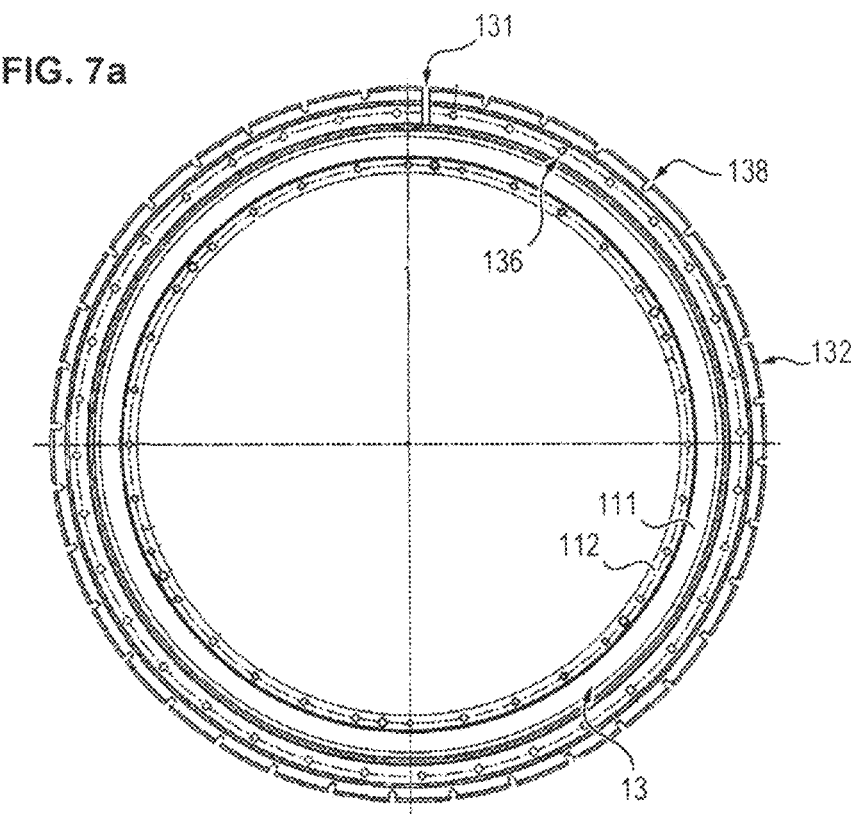
Figure 7B:
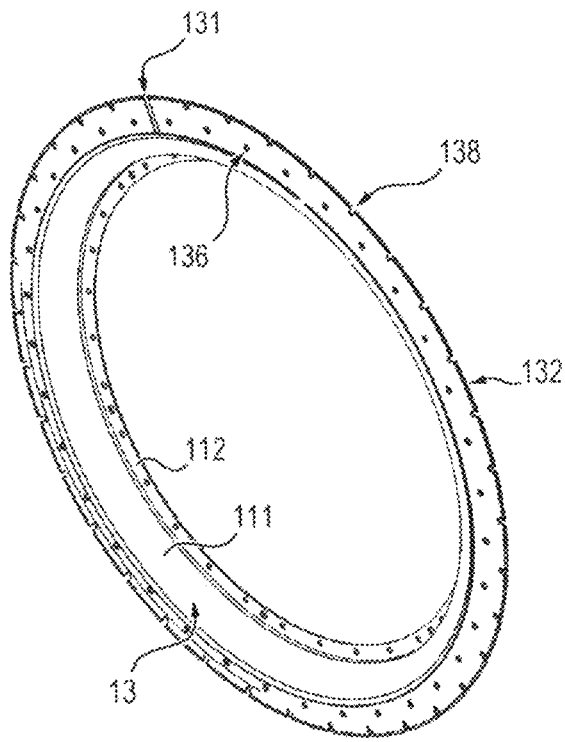
Figure 8A:
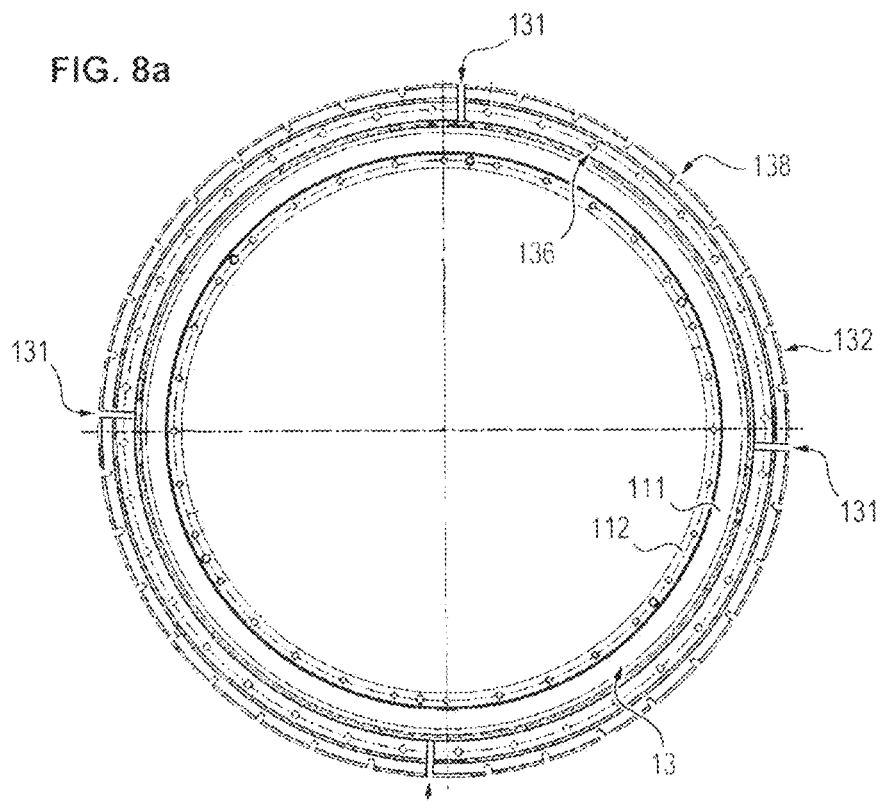
Figure 8B:
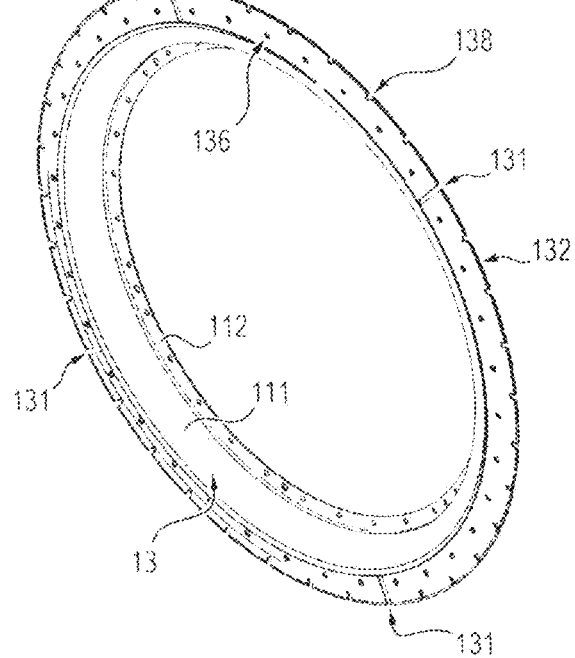
Figure 9:
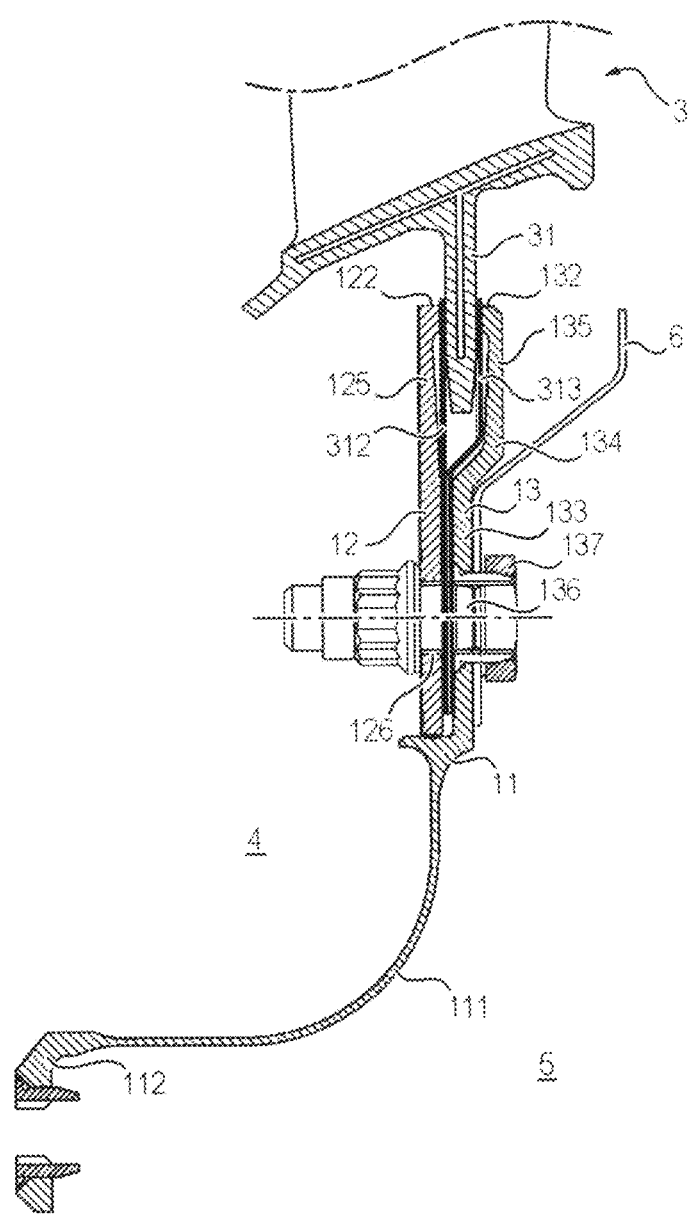
Figure 10:
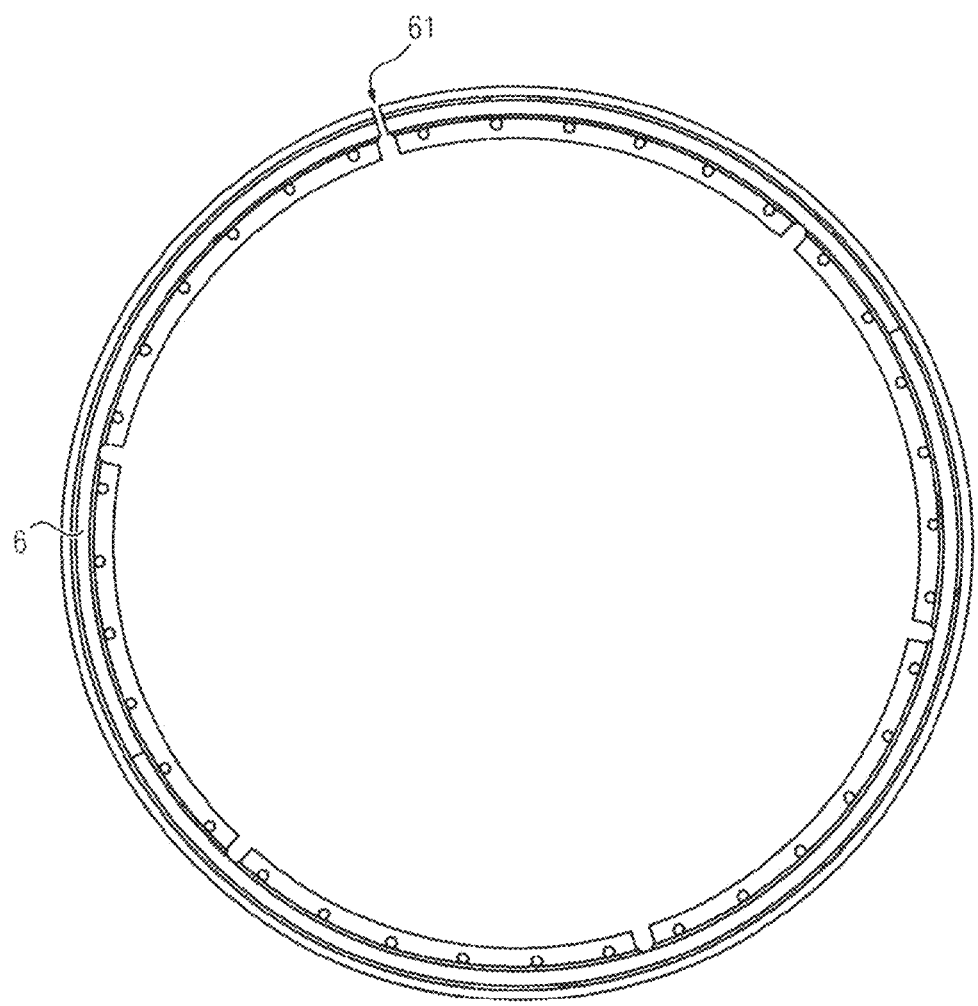
Figure 11:
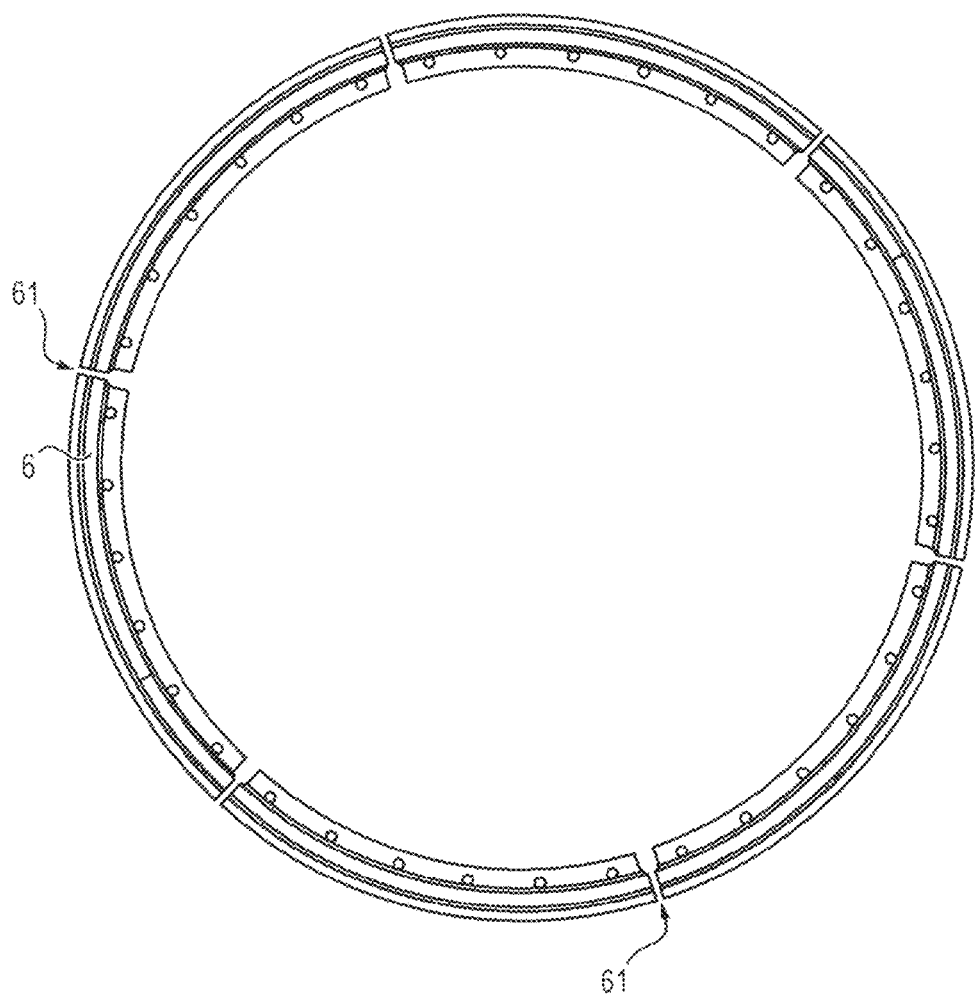
Figure 12:
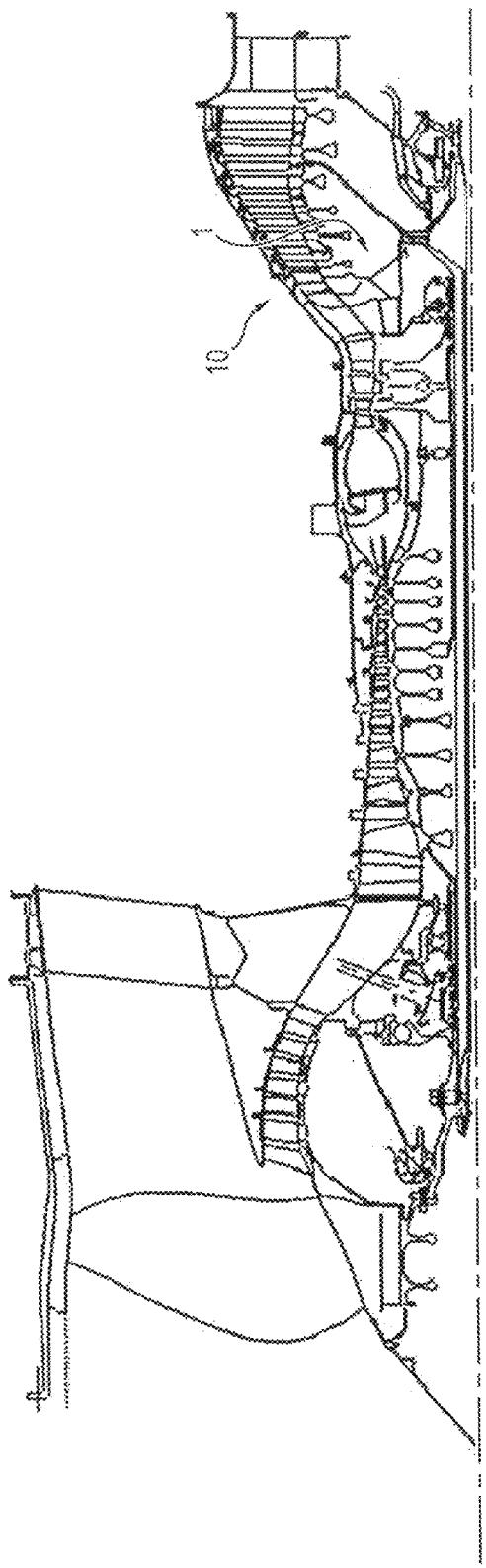

Other objects, features and advantages will become apparent upon reading the description which follows given as an illustration and not as a limitation with reference to the drawing wherein:

FIG. 1 illustrates the thermal gradient in a device according to the prior art in a turbine during normal operation, FIG. 2 illustrates the theoretical radial displacements of the device according to the prior art, in the absence of any distributor foot, FIG. 3 illustrates the forces applied to a turbine distributor connected to a device according to the prior art, FIG. 4 illustrates a sectional view of the device according to an exemplary embodiment of the invention, FIG. 5 illustrates a front view of an upstream bracket of a device of the invention according to a first exemplary embodiment of the invention, FIG. 6 illustrates a front view of an upstream bracket of a device according to a second exemplary embodiment of the invention, FIG. 7a illustrates a front view of a downstream bracket and flange secured to a device according to a third exemplary embodiment of the invention, FIG. 7b illustrate a perspective view of a downstream bracket and flange secured to a device according to a third exemplary embodiment of the invention, FIG. 8a illustrates a front view of a downstream bracket and flange secured to a device according to a fourth exemplary embodiment of the invention, FIG. 8b illustrates a perspective view of a downstream bracket and flange secured to a device according to a fourth exemplary embodiment of the invention, FIG. 9 illustrates a sectional view of a device according to a fifth exemplary embodiment of the invention, FIG. 10 illustrates a front view of an overlapping downstream metal sheet of a device according to a sixth exemplary embodiment of the invention, and FIG. 11 illustrates a front view of an overlapping downstream metal sheet of a device according to a seventh exemplary embodiment of the invention, and FIG. 12 illustrates a sectional view of a turbine engine portion comprising a turbine comprising a device according to an eighth exemplary embodiment of the invention.

DESCRIPTION

With reference to FIG. 4, a device 1 is described for connecting a fixed turbine engine portion and a foot 31 of a distributor 3 of a turbine engine turbine according to an exemplary embodiment.

With reference to FIG. 12, a turbine engine is described, comprising such a device 1. In particular, the turbine engine may comprise a turbine 10 comprising such a device 1.

Turbine Engine

General Structure

The turbine engine is for example a turbine engine of the type with a cowled fan or with a non-cowled fan (open rotor or unducted fan) of an aircraft.

The turbine engine is typically organized along an axis, a so-called turbine engine axis.

Conventionally, a flow of air which penetrates into a turbine engine at an air intake is compressed and then mixed with fuel and burnt in a combustion chamber, the combustion gases giving the possibility of driving into rotation a rotor or several turbine rotors around an axis of a turbine engine.

The turbine engine for example comprises a high pressure turbine allowing a high pressure compressor to be driven, and a low pressure turbine allowing a low pressure compressor and a fan to be driven.

Here, elements are described as inner and outer elements depending on their distance relatively to an axis of the turbine engine onto which the device is intended to be installed, when the device 1 is in an operating position.

Also, by "above" is meant positioned at a relatively large distance from the shaft of the turbine engine, and by "below" is meant positioned relatively at a smaller distance from the shaft of the turbine engine when the device 1 is in an operating position.

An element relatively closer to a shaft of the turbine engine is thus described as an inner element. Also, an element relatively more distant from the shaft of the turbine engine is described as an outer element.

Elements are described here as upstream and downstream elements, according to their relative position along the axis of the turbine engine.

Thus, an element relatively closer to an air intake of the turbine engine or more distant from an air outlet of the turbine engine, typically from a nozzle, is thus described as an upstream element. Also, an element relatively more distant from the air intake of the turbine engine or closer to the air outlet of the turbine engine is described here as a downstream element.

Typically, the terms of upstream and downstream in the general sense relate to the circulation of air in the turbine engine between its intake and its outlet.

Elements relatively to an axial respectively radial direction of the turbine engine are described as axial, respectively radial elements.

The connecting device is typically positioned at a turbine. The connecting device is for example positioned at the intake of the turbine, at a connection between the fixed turbine engine portion and the low pressure turbine, for example at the inlet of the low pressure turbine downstream from the high pressure turbine, for example at the connection between the inter-turbine casing 2 and the low pressure turbine.

Fixed Turbine Engine Portion

The fixed turbine engine portion is distinct from the foot 31 of a distributor 3. The fixed turbine engine portion is for example a casing, for example an inter-turbine casing 2.

The inter-turbine casing 2 is typically an intermediate casing between two portions of the turbine engine. The inter-turbine casing 2 may be interposed between the high pressure and low pressure turbines accommodated in their respective casings. The inter-turbine casing 2 may thus allow mechanical connection of the casing of the high pressure turbine to that of the low pressure turbine.

The inter-turbine casing 2 for example comprises internal and external walls defining a vein for circulation of the flow between the high pressure and the low pressure turbines, and arms extending between the internal and external walls.

The turbine typically comprises a plurality of stages each with a distributor receiving a gas flow and rectifying it in order to apply it on a mobile wheel rotating in a given direction. The turbine is typically a low pressure turbine.

Distributor

The distributor is for example a low pressure distributor 3 positioned at the inlet of the low pressure turbine, i.e. the upstream distributor of the low pressure turbine, typically positioned downstream from a rectifier of the fluid of the high pressure turbine, for example directly downstream from the rectifier, or downstream from a wheel itself positioned downstream from the rectifier. Alternatively, the distributor may be positioned towards the downstream side of the low pressure turbine or at another turbine.

The distributor comprises a head and a foot maintained fixed in the turbine engine. The distributor is positioned in a substantially radial way, the foot being turned towards the inside and the head towards the outside.

The head is typically attached by hooks of a casing of the turbine engine.

The foot is attached to the connecting device.

Ring-Shaped Body

General Structure

The device comprises a ring-shaped body 11.

The body 11 is ring-shaped, i.e. it has an angular shape.

The body 11 is adapted so as to be connected and secured to the fixed portion of a turbine engine, typically to the inter-turbine casing 2.

By a secured connection between two elements, is typically meant that the connection is such that a movement of one of the elements according to a degree of freedom involves the same movement of the other element according to the same degree of freedom. The secured connection is for example an attachment.

This secured connection ensures the maintaining of the foot 31 of the distributor.

This secured connection may also allow separation of the upstream side and the downstream side of an area under the foot 31 of the distributor when the device is positioned in the turbine engine.

Connection Secured to the Fixed Turbine Engine Portion.

The secured connection of the body 11 to the fixed turbine engine portion, notably to the inter-turbine casing 2, may be achieved by any means known to one skilled in the art.

The secured connection may thus be done by welding (not shown).

Alternatively, the body 11 may have at least one attachment bracket 112. Such an attachment bracket 112 typically has an orifice through which an attachment element 113 may be inserted, typically an element of the bolt type, as illustrated or an element of the screw-nut type.

The attachment element 113 may be adapted so as to pass through an orifice of the fixed turbine engine portion, typically of the inter-turbine casing or of an intermediate connecting element 114 for example comprising dedicated brackets which will clamp a wall of the fixed turbine engine portion, typically of the inter-turbine casing 2. Such an intermediate connecting element 114 may be included into the device 1 or form a separate element of the device 1.

It is understood that such a layout may be reproduced several times along the ring-shaped structure of the body 11 so as to ensure better attachment.

Flange

In order to separate the upstream side and the downstream side of an area under the foot 31 of the distributor when the device is positioned in a turbine engine, the body 11 may comprise a ring-shaped flange 111.

By ring-shaped flange is meant an element forming a plate having an annular shape.

The flange 111 is for example adapted so as to be connected and secured to the fixed turbine engine portion, typically to the inter-turbine casing 2.

The secured connection may be made as described earlier.

The flange 111 is for example connected to the fixed turbine engine portion, typically to the inter-turbine casing 2, so that the device 1 prevents any circulation of fluid under the foot 31 of the distributor, typically in an area extending under the foot 31 of the distributor.

For example it is possible to prevent any circulation of fluid between upstream 4 and downstream chambers respectively positioned upstream and downstream from the distributor foot 31.

Interrupted Bracket

General Structure

The device comprises two rackets, an upstream bracket 12 and a downstream bracket 13.

By ring-shaped bracket, is generally meant an attachment part with an annular shape, i.e. perforated in its center, and typically having orifices in its periphery in order to allow attachment to another element, typically another element forming a bracket.

The brackets 12 and 13 are ring-shaped brackets, i.e. they each have an annular shape.

By annular shape, is meant a shape extending substantially around a given axis, the shape being located in an area comprised between a first axisymmetrical cylinder centered on the axis and having a first radius and a second axisymmetrical cylinder centered on the axis and having a second radius larger than the first radius.

In other words, the annular shape extends substantially around the axis while remaining at a minimum distance from the axis, like a ring.

An annular shape thus typically comprises a shape having a substantially rounded outer contour and having a central orifice.

The annular shape may be continuous, i.e. its projections in planes orthogonal to the axis comprise a closed loop positioned around the axis.

The annular shape may be interrupted, i.e. its projections in planes orthogonal to the axis comprise a loop having at least one interruption, i.e. one or a plurality of interruptions.

The interruption may interrupt the shape right through like a C or only partly, i.e. a closed loop surrounds the axis, the closed loop being in at least one substantially thinner area than the remainder of the shape.

Secured Connection to the Body

The brackets 12 and 13 are each secured to the body 11.

When the body 11 comprises a flange 111, the connection of a bracket 12 or 13 to the body 11 may be a direct connection to the flange or via an intermediate portion, and/or via the other bracket.

The secured connection may thus be made by welding or the body 11 and the bracket 12 or 13 may be made so as to form only one piece.

Alternatively or additionally, the bracket 12 or 13 may be mounted secured to the body 11.

According to an example, the bracket 12 or 13 may comprise at least one attachment orifice 126 or 136. Such an attachment orifice 126 or 136 may be laid out so that an attachment element 137 may be inserted right through, typically an element of the bolt type as illustrated, or an element of the screw-nut type (not shown).

The attachment element 137 may be adapted so as to pass through an orifice of the body 11 and/or an intermediate connecting element, typically the other bracket.

It is understood that such an arrangement may be reproduced several times along the ring-shaped structure of the bracket so as to ensure better attachment.

With reference to FIG. 4, one of the brackets, typically the upstream bracket 12 may be connected and secured by welding it to the body 11 along an annular connecting area. The other bracket, typically the downstream bracket 13 may be mounted secured onto the upstream bracket 12 by means of attachment elements 137 passing through aligned orifices of both bracket 12 and 13, each bracket 12 and 13 having a plurality of orifices distributed along their angular structure.

Connection to the Foot of the Distributor

Both brackets 12 and 13 are adapted so that they will clamp the foot 31 of the distributor. Both brackets 12 and 13 thereby form a clamp.

Both brackets 12 and 13 thus come into contact with the foot 31 of the distributor, on either side of the distributor, in order to maintain it in position in the turbine engine.

The brackets 12 and 13 thus allow connection of the body 11 and of the foot 31 of the distributor, for example through a translationally secured connection along the axis of the turbine engine, preferably also secured in rotation along axes orthogonal to the axis of the turbine engine, preferably secured in rotation regardless of the axis.

Preferably, the connection is secured in rotation and secured in translation except along the radial axis i.e. the only allowed relative movement is translation along the axis orthogonal to the axis of the rotor by the engine oriented in the same direction as the foot 31.

The connection may alternatively be a secured connection in translation and in rotation.

Both brackets 12 and 13 will typically come into contact with the foot 31 of the distributor at respective ends 125 and 135.

For this purpose, the brackets 12 and 13 are typically laid out so that the ends 125 and 135 of both brackets 12 and 13 are separated by a space, this space forming a space for receiving the foot 31 of the distributor.

The size of the space may typically be adjusted, for example by means for connecting one bracket 13 to the other 12, for example connecting means 136 and 137 as described earlier.

In order to obtain a sealed contained area, it is possible to position a sealing element comprising one or several sealing parts, for example one or several sealing plates or platelets, typically sealing metal sheets 312 and 313 between each bracket 12 and 13, and the foot 31 of the distributor. Between at least one of the brackets 12 and/or 13 and the foot 31 the sealing element may thus be formed with a plurality of a distinct sealing parts distributed along the area positioned between the bracket and the foot 31, the damping parts being separated from each other so as to form interruptions of the sealing element.

Expansion and/or Retraction Slot

General Characteristics

At least one bracket 12 and/or 13 is interrupted while forming a slot 121 and/or 131 for expansion and/or retraction.

The slot 121 and/or 131 is dimensioned so as to allow modification of the shape of the corresponding bracket 12 and/or 13 under the effect of the differences in the internal temperatures of the device. Such a modification tends to modify the shape of the slot 121 and/or 131.

Thus, the slot 121 and/or 131 for example forms an expansion slot dimensioned so as to allow expansion of the corresponding bracket 12 and/or 13 under the effect of a difference in the internal temperatures of the device. Such an expansion tends to close the slot 121 and/or 131.

Alternatively or additionally, the slot 121 and/or 131 forms a retraction slot, and is dimensioned so as to allow retraction of the corresponding bracket 12 and/or 13 under the effect of a difference in internal temperatures of the device. Such a retraction tends to further open the slot 121 and/or 131, i.e. increase its aperture.

During normal operation of the turbine engine, the upstream side of the device 1 is subject to significant thermal radiation from the fixed turbine engine portion, typically from the inter-turbine casing 2, as well as to possible returns of a high temperature fluid in the upstream and downstream chambers.

The result of this is a particularly high temperature gradient between the upstream side and the downstream side of the device (axial gradient), and between the outer portion and the inner portion (radial gradient) relatively to the axis of the turbine engine, in particular between the upstream outer portion and the downstream inner portion.

This temperature gradient causes a variation of the tangential stresses within the device.

The hotter areas tend to expand, to extend. Conversely the colder areas tend to retract.

In the devices according to the prior art, the hotter areas thus tend to be move outwards while the colder areas tend to retract towards the axis of the turbine engine.

Now, unlike the prior art, the presence of a slot gives the possibility of modifying the profile of stresses within the device, in particular within the portion of the device having the slots, typically the upstream bracket 12 and/or the downstream bracket 13.

Thus, a hotter area of a bracket 12 having such a slot 121 tends to expand at the slot 121 so as to close the slot 121 and extends less outwards, or even does not extend outwards.

Also, a colder area of bracket 13 having a slot 131 tends to retract at the slot so as to open the slot, retracts less towards the axis of the turbine engine, or even does not retract towards the axis of the turbine engine.

The result of this is a substantial decrease in the extent of the tilting moment of the device 1 towards the downstream side, or even its disappearance.

Indeed, in the case of the device according to the invention, the radial or/and axial stresses are strongly reduced relatively to the device according to the prior art, the stresses are transferred orthogonally to the axis of the turbine engine because of the presence of three ends of the device 1 on either side of the slot 121 or 131.

Thus, the tilting forces exerted on the foot 31 of the distributor by the device 1 are then reduced, decreasing by as much the wear of the distributor 3 and the risks of failure of the distributor 3 at a stress area.

The slot 121 and/or 131 is typically alternately a retracting slot and an expansion slot between the passage of the turbine engine from a non-operating state and to a normal operating state and between the passage of the turbine engine from a normal operating state to a non-operating state.

Thus, in addition to globally reducing the forces exerted on the foot of the distributor 3, the invention gives the possibility of reducing the phenomenon of periodic repetition of forces exerted on the foot of the distributor, which may further increase the wear of the foot 31 clamped by a device according to the prior art relatively to a constant force.

Said at least one interrupted bracket for example comprises the upstream bracket 12. The slot 121 thus typically forms an expansion slot during normal operation of the turbine engine.

Said at least one interrupted bracket comprises the downstream bracket 13. The slot 121 thus typically forms an expansion slot during normal operation of the turbine engine.

Plurality of Slots.

The bracket 12 and/or 13 may comprise a single slot 121 and/or 131 as illustrated in FIG. 5 and in FIGS. 7*a*-7*b*.

Alternatively, the bracket 12 and/or 13 may comprise a plurality of slots 121 and/or 131.

It is thus possible to modify the behavior of the upstream bracket 12 and/or of the downstream bracket 13 in a more significant way, since it is not necessarily easy to produce a single slot with a sufficient size for reducing as desired the forces exerted on the foot 31 of the distributor.

Moreover, it is thus possible to modify in a more significant and more homogenous way the stresses in the corresponding bracket.

Indeed, as the brackets 12 and 13 are intended to be attached, the attachments may reduce the transfer of the stresses in areas away from the slot 121 and/or 131.

A plurality of slots therefore allows modification of the stresses in a substantial way in distinct areas of the corresponding bracket.

Said at least one slot 121 and/or 131 is preferably positioned radially at least at one of the sealing elements 312 and/or 313.

Thus, it is possible to preserve a seal between the upstream chamber 4 and the downstream chamber 5, the slot 121 and/or 131 not allowing fluid communication between both chambers 4 and 5 since it is positioned radially so as to be directly upstream or downstream from a sealing element 312 and/or 313 providing the seal.

In particular, when both sealing elements comprise at least one interruption, at least one of the sealing elements 312/313 does not have any interruption positioned radially at said at least one slot 121 and/or 131. When at least one sealing element consists of sealing parts, said at least one slot 121 and/or 131 is positioned radially at one of the sealing parts and not at the level of an interruption between two sealing parts.

Even more advantageously, none of the sealing elements 312 and 313 comprises any interruption at said at least one slot 121 and/or 131.

Extension of the Slot.

Preferably, the slot 121 and/or 131 extends from an outer edge 122 and/or 132 of the bracket 12 and/or 13, towards the body 11. Such an embodiment is illustrated in FIGS. 7*a*-8*b*.

Preferably, the slot 121 and/or 131 extends from the outer edge 122 and/or 132 of the bracket 12 and/or 13, as far as the body 11. Such an embodiment is illustrated in FIGS. 5-8*b*.

The slot 121 and/or 131 may for example cross right through the bracket 12 and/or 13, in particular the part comprising the bracket 12 and/or 13. Thus, the slot extends between two totally free portions of the part which allows greater modification of the shape. Such an embodiment is illustrated in FIGS. 5 and 6.

The slot 121 and/or 131 may cross the major portion of the bracket 12 and/or 13 without however passing right through it. In this case, said at least one slot 121 and/or 131 preferentially interrupts at least the structural portion of the bracket 12 and/or right through it. By structural portion, is meant the portion of the bracket 12 and/or 13 positioned facing the corresponding upstream or downstream bracket positioned on the other side of the foot 31 of the distributor 3. Thus typically, are meant the entirety of a bracket which is not made with a flange 111 in the same material and the corresponding portion of a bracket connected to a flange 111. It is thus possible to preserve a connecting area with another element of device 1, typically the body 11, at said at least one slot 121 and/or 131, which facilitates the mounting of the device 1 and/or its robustness. Such an embodiment is illustrated in FIGS. 7*a*-8*b*.

Preferably, both brackets 12 and 13 may each be interrupted in order to form such slots 121 and 131.

A bracket, typically the downstream bracket 13 may then be in a major portion crossed by the slot 131 from its outer edge, the inner edge of the downstream bracket 13 being directly connected to the body 11 so as to form a single part. The other bracket, typically the upstream bracket 12 may then be crossed right through by the slot 121, the upstream bracket 12 being directly connected to the downstream bracket 13.

Such an exemplary embodiment is for example illustrated by the device illustrated in FIG. 9, by one of the upstream brackets 12 illustrated in FIG. 5 or 6, and by one of the downstream 13 illustrated in FIGS. 7*a* and 7*b* or 8*a* and 8*b*.

Projection

According to a particular embodiment, illustrated in FIG. 9, the upstream bracket 12 may be planar and the downstream bracket 13 may have two portions forming a projection.

Thus, the downstream bracket may comprise an inner portion 133 connected to the body and to an outer portion 134 shifted relatively to the inner portion 133 while forming a projection.

The two portions 134 and 133 are laid out so that an end 125 of the upstream bracket 12 and an end 135 of the downstream bracket 13 are separated by a space for receiving the foot 31 of the distributor.

In such a configuration, the projection is typically directed downstream so as to orient the tangential stresses applied by the device 1 to the foot 31 of the distributor, typically of the low pressure distributor, by differences in temperatures internal to the device 1.

In this way, the areas exposed to thermal radiations and to hot fluids are reduced and the temperature profile internal to the device 1 is modified.

Such a configuration, combined with a modification of the stresses resulting in the presence of at least one interruption at the upstream bracket 12, but preferably not at the downstream bracket 13, gives the possibility of obtaining a downstream tilt of the device 1, in the opposite direction to the tilt observed with a device according to the prior art.

Indeed, the interruption of the upstream bracket 12 allows a decrease in the traction forces upstream from the device. On the other hand, the absence of any interruption of the downstream bracket 13 and the presence of the projection, which modifies the material distribution of the device and therefore the resultant of the forces, gives the possibility of obtaining traction forces downstream from the device, in particular even more downstream than in the case of the device according to the prior art.

The resultant of the forces is thus modified and the torque applied to the device tends to tilt the device 1 upstream. Such a situation is favorable in that it gives the possibility of opposing pressure forces applied on the flange 111 which transmits them to the distributor 3.

According to an advantageous embodiment, the device 1 further has a rear overlapping metal sheet or a downstream overlapping metal sheet 6, also called a discourager joint, interrupted by a slot 61 according to the invention, so as to limit the compression forces downstream from the device 1.

Scalloping

The upstream 12 and/or downstream 13 bracket may have a scalloping, typically between the attachment orifices 126 and/or 136.

By scalloping is meant that the orifices are placed between notches 138 giving the ring-shaped upstream bracket 12 and/or downstream bracket 13 a "scallop" shape, or in other words, a crenelated shape with typically rounded edges.

The notches between the scallops are not dimensioned for forming at least one slot 121 and/or 131, in particular they extend less deeply, i.e. over a smaller distance, in the corresponding bracket from an edge of this bracket.

Indeed, the scallops are dimensioned so as to allow displacements of the different distributor feet 31 connected to different upstream 12 and/or downstream 13 brackets relatively to each other, in particular relative displacements of the various feet 31 along the direction defined by the axis of the turbine engine.

Downstream Overlapping Metal Sheet

General Structure

The device 1 may further comprise an annular downstream overlapping metal sheet 6 secured to the body 11.

The downstream overlapping metal sheet 6 is positioned downstream from the brackets 12 and 13, so as to limit heating-up of a downstream chamber 5 positioned under and downstream from the foot 31 of the distributor, by a flow of a fluid from a vein 7 located above the downstream chamber 5.

Secure Connection to the Body

The downstream overlapping metal sheet 6 is typically made so as to be secured to the body in a similar way to the brackets 12 and 13.

When the body 11 comprises a flange 111, the connection of the downstream overlapping metal sheet 6 to the body 11 may be a direct connection to the flange or via an intermediate portion and/or via a bracket 12 and/or 13.

The secured connection may thus be made by welding or the body 11 and the downstream overlapping metal sheet 6 may be made so as to only form a single part.

Alternatively or additionally, the downstream overlapping metal sheet 6 may be mounted secured to the body 11, directly or via a bracket 12 or 13.

According to an example, the downstream overlapping metal sheet 6 may comprise at least one attachment orifice 66. Such an attachment orifice 66 may be arranged so that an attachment element 137 may be inserted through it, typically an element of the screw-nut type, typically an element of the bolt type, as illustrated.

The attachment element 137 may be adapted for passing through an orifice of the body 11 and/or of an intermediate connecting element, typically the upstream bracket 12 and/or the downstream bracket 13.

It is understood that such a layout may be reproduced several times along the annular structure of the bracket so as to ensure better attachment.

With reference to FIG. 4, one of the brackets, typically the upstream bracket 12 may be connected so as to be secured to the body 11 by welding along an annular connecting area. The downstream overlapping metal sheet 6 may be mounted so as to be secured on the upstream bracket 12 by means of attachment elements 137 passing through aligned orifices of the upstream bracket 12 of the downstream overlapping metal sheet 6, each having a plurality of orifices distributed along their annular structure.

Expansion and/or Retraction Slot

General Features

Additionally and/or alternatively to said at least one interruption by a slot according to the invention of the upstream bracket 12 and/or of the downstream bracket, the downstream overlapping metal sheet 6 is, according to an alternative embodiment, interrupted by forming an expansion and/or retraction slot 61.

The slot 61 is dimensioned so as to allow modification of the shape of the downstream overlapping metal sheet 6 under the effect of a difference in the internal temperatures of the device. Such a modification tends to modify the shape of the slot 61.

Thus, the slot 61, for example, forms an expansion slot dimensioned so as to allow expansion of the downstream overlapping metal sheet 6 under the effect of a difference in internal temperatures of the device. Such an expansion tends to close the slot 61.

Alternatively or additionally, the slot 61 forms a retraction slot and is dimensioned so as to allow expansion of the downstream overlapping metal sheet 6 under the effect of a difference in internal temperatures of the device. Such an expansion tends to further open the slot 61, i.e. increase its aperture.

During normal operation of the turbine engine, the upstream side of the device 1 is subject to significant thermal radiation from the fixed turbine engine portion, typically from the inter-turbine casing 2, as well as to possible returns of a high temperature fluid into the upstream and downstream chambers.

The result of this is a particularly high temperature gradient between the upstream side and the downstream side of the device (axial gradient), and between the outer portion and the inner portion (radial gradients) relatively to the axis of the turbine engine, in particular between the upstream outer portion and the downstream inner portion.

This temperature gradient causes a variation of the tangential stresses within the device.

Hotter areas tend to expand, to extend. Conversely colder areas tend to retract.

In the devices according to the prior art, the hotter areas thus tended to move outwards while the colder areas tended to retract towards the axis of the turbine engine.

Now, unlike the prior art, the presence of a slot gives the possibility of modifying the profile of stresses within the device, in particular within the portion of the device having the slot, typically the upstream bracket 12 and/or the downstream bracket 13 and/or the downstream overlapping metal sheet 6.

Thus, a colder area of the downstream overlapping metal sheet 6 having a slot 61 tends to shrink at the slot so as to open the slot and retract less towards the axis of the turbine engine, or even does not retract towards the turbine engine.

The result of this is a substantial decrease in the extent of the tilting torque of the device 1 upstream, or even its disappearance.

Indeed, in the case of the device according to the invention, the radial and/or axial stresses are strongly reduced relatively to the device according to the prior art, the stresses are transferred orthogonally to the axis of the turbine engine because of the presence of three ends of the device 1 on either side of the slot 61.

Thus, the tilting forces exerted on the foot 31 of the distributor by the device 1 are then reduced, decreasing by as much the wear of the distributor 3 and the risks of failure of the distributor 3 at a stress area.

The slot 61 is typically alternately an expansion slot and a retraction slot between the passage of the turbine engine from a non-operating state and to a normal operating state and between the passage of the turbine engine from a normal operating state to a non-operating state.

Thus, in addition to globally reducing the forces exerted on the foot of the distributor 3, the invention allows a reduction of the phenomenon of periodic repetition of forces exerted on the foot 31 of the distributor, which may further increase the wear of the foot 31 clamped by a device according to the prior art relatively to a constant force.

The interrupted downstream overlapping metal sheet may be combined in the same device with an interrupted upstream slot 12 and/or an interrupted downstream slot 13 so as to combine the advantages of the different interruptions on the modification of the forces exerted on the foot 31 of the distributor.

Plurality of Slots.

The downstream overlapping metal sheet 6 may comprise a single slot 61, as illustrated in FIG. 10.

Alternatively, the downstream overlapping metal sheet 6 may comprise a plurality of slots 61, as illustrated in FIG. 11.

It is thus possible to modify the behavior of the downstream overlapping metal sheet 6 in a more significant way, since it is not necessarily easy to produce a single slot with a sufficient size in order to reduce as much as desired the forces exerted on the foot 31 of the distributor.

Moreover, it is thus possible to modify in a more significant way and more homogenously the stresses in the corresponding bracket.

Indeed, as the downstream overlapping metal sheet is intended to be attached, the attachment may decrease the transfer of the stresses into areas away from the slot 61.

A plurality of slots therefore allows modification of the stresses in a substantial way in distinct areas of the downstream overlapping metal sheet 6.

Extension of the Slot.

Preferably, the slot 61 extends from an outer edge of the downstream overlapping metal sheet 6, towards the body 11.

Preferably, the slot 61 extends from the outer edge of the downstream overlapping metal sheet 6, as far as the body 11.

The slot 61 may for example cross right through the downstream overlapping metal sheet 6, in particular the part comprising the downstream overlapping metal sheet 6. Thus, the slot 61 extends between two totally free portions of the part which allows a greater modification of the shape.

The slot 61 may cross the major portion of the downstream overlapping metal sheet 6 without however crossing it right through. It is thus possible to preserve a connecting area with another element of the device 1, typically the body 11, at the slot 61, which facilitates the mounting of the device 1 and/or its robustness.

The invention claimed is:

1. A device for connecting a fixed portion of a turbine engine and a foot of a distributor comprising:
    a ring-shaped body adapted so as to be connected and secured to the fixed portion of the turbine engine, and
    a ring-shaped upstream bracket and a ring-shaped downstream bracket, the upstream and downstream brackets being adapted so as to clamp the foot of the distributor,
    wherein the fixed portion is an inter-turbine casing of the turbine engine positioned downstream of a high pressure turbine, and
    wherein the upstream bracket includes an expansion slot which expands to close the expansion slot above a predetermined temperature and the downstream bracket includes a retraction slot which retracts so as to open the retraction slot below the predetermined temperature, and at an operating condition of the turbine engine, a tilting moment of the device towards a downstream side is eliminated due to closing of the expansion slot and opening of the retraction slot.

2. The device according to claim 1, wherein the expansion slot extends from an outer edge of the upstream bracket towards the body, and the retraction slot extends from an outer edge of the downstream bracket towards the body.

3. The device according to claim 2, wherein the expansion slot extends from the outer edge of the upstream bracket as far as the body, and the retraction slot extends from the outer edge of the downstream bracket as far as the body.

4. The device according to claim 1, wherein the body further comprises a ring-shaped flange adapted so as to be connected and secured to the fixed portion of the turbine engine so that the device prevents any fluid circulation under the foot, between upstream and downstream chambers positioned upstream and downstream from the foot, respectively.

5. The device according to claim 1, further comprising an annular downstream overlapping metal sheet secured to the body and positioned downstream from the upstream and downstream brackets so as to limit heating-up of a downstream chamber positioned under and downstream from the foot of the distributor, by a fluid from a vein located above the downstream chamber wherein the downstream overlapping metal sheet is interrupted by forming a sheet slot, the sheet slot allowing expansion of the downstream overlapping metal sheet tending to close the sheet slot under the effect of a difference in internal temperatures of the device.

6. The device according to claim 1, wherein the upstream bracket is planar and the downstream bracket has an inner portion connected to the body and an outer portion shifted relatively to the inner portion by forming a projection, so that ends of both brackets are separated by a space for receiving the foot of the distributor, the projection being directed downstream so as to orient tangential stresses applied by the device to the distributor by differences in internal temperatures of the device.

7. A device for connecting a fixed turbine engine portion and a distributor foot, comprising:
- a ring-shaped body adapted so as to be connected and secured to the fixed turbine engine portion,
- a ring-shaped upstream bracket and a ring-shaped downstream bracket, the upstream and downstream brackets being adapted so as to clamp the distributor foot, and
- an annular downstream overlapping metal sheet secured to the body and positioned downstream from the upstream and downstream brackets, the downstream overlapping metal sheet being laid out so as to limit heating-up of a downstream chamber by a fluid from a vein located above the downstream chamber, the downstream chamber being positioned under and downstream from the distributor foot,
- wherein the downstream overlapping metal sheet is interrupted by forming a sheet slot, the sheet slot allowing expansion of the downstream overlapping metal sheet tending to close the sheet slot or retraction of the downstream overlapping metal sheet tending to further open the sheet slot under the effect of a difference in internal temperatures of the device,
- wherein the fixed turbine engine portion is an inter-turbine casing of a turbine engine positioned downstream of a high pressure turbine, and
- wherein the upstream bracket includes an expansion slot which expands to close the expansion slot above a predetermined temperature and the downstream bracket includes a retraction slot which retracts so as to open the retraction slot below the predetermined temperature, and at an operating condition of the turbine engine, a tilting moment of the device towards a downstream side is eliminated due to closing of the expansion slot and opening of the retraction slot.

8. A turbine engine turbine section comprising a device according to claim 1.

9. A turbine engine comprising a device according to claim 1.

10. The device according to claim 1, wherein the distributor is positioned downstream of a rectifier of fluid of the high pressure turbine.

11. The device according to claim 1, wherein at least one of the upstream or downstream brackets is scalloped.

12. The device according to claim 7, wherein the distributor is positioned downstream of a rectifier of fluid of the high pressure turbine.

13. The device according to claim 7, wherein the downstream overlapping metal sheet includes a radial inner portion, a frustoconical intermediate portion, and a radial outer portion, the sheet slot being provided in the radial outer portion, and an attachment orifice being provided in the radial inner portion.

14. The device according to claim 1, wherein the upstream bracket includes a radial inner portion, a frustoconical intermediate portion, and a radial outer portion, the radial outer portion being disposed upstream of the radial inner portion, and the expansion slot being provided in the radial outer portion.

15. The device according to claim 7, wherein the upstream bracket includes a radial inner portion, a frustoconical intermediate portion, and a radial outer portion, the radial outer portion being disposed upstream of the radial inner portion.

* * * * *

UNITED STATES PATENT AND TRADEMARK OFFICE
CERTIFICATE OF CORRECTION

PATENT NO. : 9,752,506 B2
APPLICATION NO. : 14/503721
DATED : September 5, 2017
INVENTOR(S) : Eric Schwartz et al.

It is certified that error appears in the above-identified patent and that said Letters Patent is hereby corrected as shown below:

On the Title Page

Item (72) Inventors, change "Renaud Gabriel Constant Royan, Susy en Brie (FR)" to -- Renaud Gabriel Constant Royan, Sucy en Brie (FR) --.

Signed and Sealed this
Fourteenth Day of May, 2019

Andrei Iancu
*Director of the United States Patent and Trademark Office*